May 25, 1971 G. X. CRINER ET AL 3,580,763
METHOD OF PRODUCING FIBER-REINFORCED FOAM PRODUCTS
Filed March 13, 1969
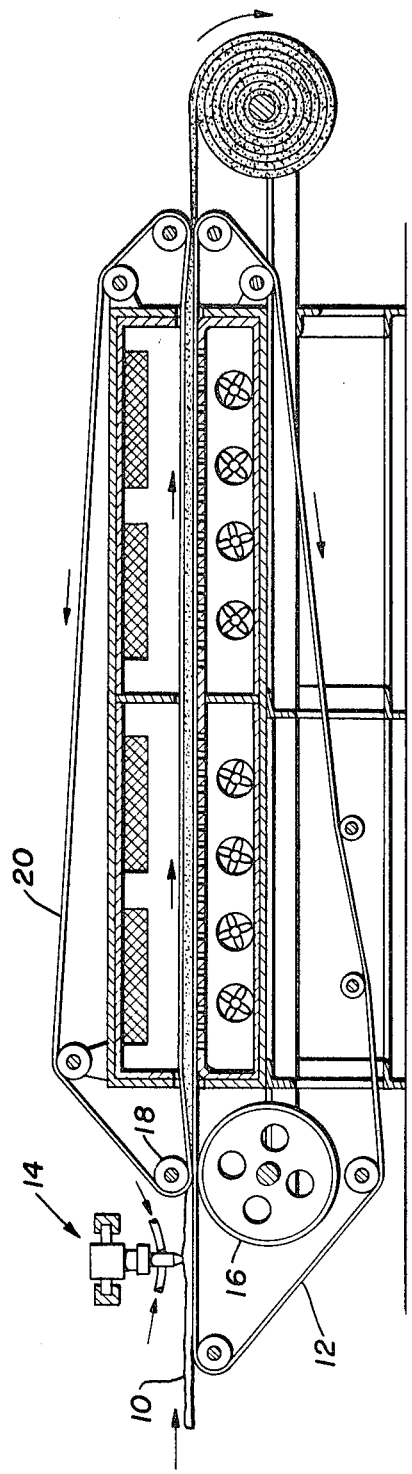
FIG. I.
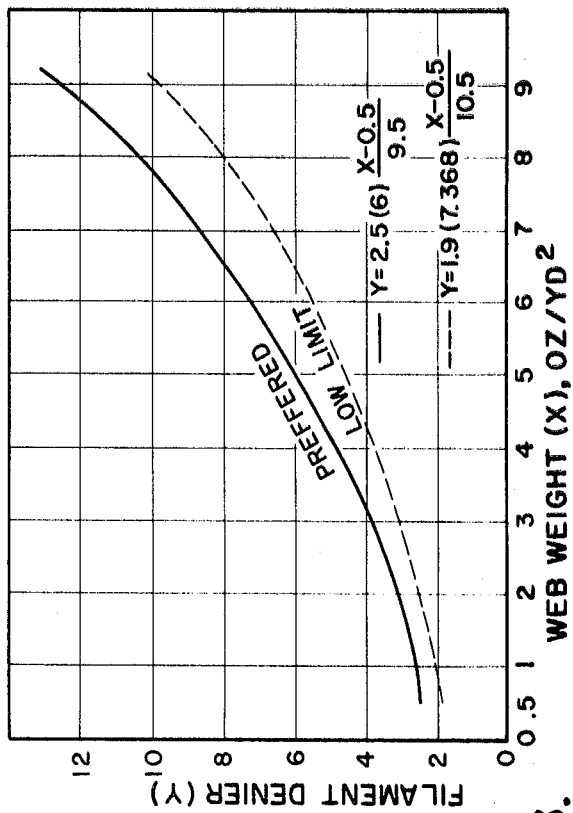
FIG. 3.
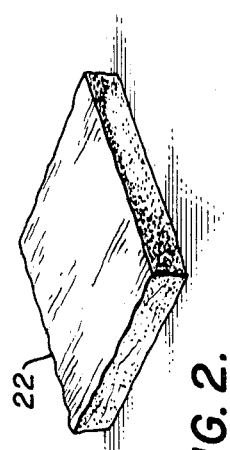
FIG. 2.
INVENTORS
GASPARD X. CRINER
WILLIAM A. BLACKBURN
BY
ATTORNEY

United States Patent Office 3,580,763
Patented May 25, 1971

---

3,580,763
METHOD OF PRODUCING FIBER-REINFORCED FOAM PRODUCTS
Gaspard X. Criner, Cary, and William A. Blackburn, Chapel Hill, N.C., assignors to Monsanto Company, St. Louis, Mo.
Continuation-in-part of application Ser. No. 578,073, Sept. 8, 1966. This application Mar. 13, 1969, Ser. No. 820,033
Int. Cl. B32b 5/18
U.S. Cl. 156—78                 1 Claim

ABSTRACT OF THE DISCLOSURE

Flexible fiber-reinforced foam products, comprised of unitary cellular structure foam bodies, the foam bodies having a fiber content comprising a multiplicity of staple fibers randomly oriented in a multi-directional pattern and distributed with uniform randomness throughout the body, the fiber content per unit area being at least the amount determined with respect to the denier by the equation:

$$y = 1.9(7.368)^{\frac{x-0.5}{10.5}}$$

where $y$=fiber denier and $x$=web weight in ounces per square yard, are produced by forming a nonwoven web consisting of randomly oriented fibers of controlled interfiber cohesion and porosity, dispensing a foamable mixture onto the web, and then compressing the foam-covered web.

---

This application is a continuation-in-part of our application Ser. No. 578,073, filed Sept. 8, 1966.

This invention relates to fiber-reinforced foam products, and more particularly the invention relates to a method for impregnating a continuous non-woven batting of staple fibers with a foamable mixture to produce a continuous thin layer of fiber reinforced foam products. The invention also relates to a method for joining lengths of the batting material to facilitate a continuous operation.

In the production of fiber-reinforced foam products, it is known that the recovery rate from nip roll compression must correspond to the foam rate or rise of the foamable impregnant to provide an acceptable product. If the recovery rate of the compressed fibrous batt exceeds the rate of foam expansion the cell walls of the foam will be ruptured resulting in a collapsed foam. Various attempts have been made to either avoid this problem by not compressing the fibrous batt while foaming, or to overcome the problem by employing a complicated system of plates systematically controlled to simultaneously control the recovery rate of a previously compressed batting. These attempts, when successful, suffer from obvious drawbacks since the batt must be compressed in order to produce thin products from foams which increase greatly in volume and a system for controlling the recovery rate of a compressed batt with compression means is expensive and difficult to control.

It is an object of this invention to provide a fiber-reinforced product having improved properties which result from a predetermined selection of the weight per unit area of the fibrous batt material with respect to the denier of the fibers comprising the batt. Another object is to provide an improved fiber reinforced foam sheet product by controlling the interfiber cohesion between the fibers employed to reinforce the foamed material. Another object is to provide a method for joining lengths of the fibrous batting together whereby uniform thickness of the continuous sheet product is maintained at the point of joinder. Other objects and advantages will become apparent from the drawings and description to follow.

The product of this invention is comprised of carded staple fibers randomly oriented in a multi-directional pattern to provide a compacted batting having a predetermined density as determined by the denier of the fibers whereby proper penetration of the batting with a foamable material occurs to produce a continuous cellular structure foam sheet product. The foamable materials foam at a rate corresponding to the recovery rate of the fibrous batting which is in a substantially unconfined area so as not to restrict the growth of the foam. As would be expected, a superior fiber reinforced product is obtained since the growth rate of the foam corresponds to the recovery rate of the compressed fibers without having to restrict the said rate of either component. Growth rate refers to the rate at which the foamable materials rise after foaming thereof is initiated. Recovery rate is the rate of growth in thickness of a compressed batt of fibers after the compressive force has been removed.

The method of preparing the improved products of this invention is accomplished by the proper selection of the size of the fibers and the weight of a non-woven web formed therefrom per unit area to effectively control the cohesive interfiber forces whereby foaming can be carried out in such a manner that no significantly restrictive forces are imposed on the growth of the foam cells. It has been discovered that in the selection of fibers and the unit weight of the batt formed from said fibers, there is a critical relationship which must be observed in order to obtain a suitable product in accordance with the invention set forth. This relationship is expressed by the function of the following equation:

$$y = 1.9(7.368)^{\frac{x-0.5}{10.5}}$$

wherein $y$=denier and $x$=web weight in ounces per square yard.

The above equation was derived by plotting fiber denier versus batt weight for several samples which were subsequently foam-filled. The results obtained clearly indicated that the staple fiber denier must be controlled with respect to the weight of batt per unit area to produce an acceptable product. Any value falling below the line plotted from the equation set forth will result in an inferior product. The batt is not completely penetrated by the foamable mixture and thus results in areas which are partially foamed and areas where the foam is collapsed. As will be apparent from the equation, an increase in denier of the fiber above that specified in the lower-limit equation is permissive at a constant web weight since this relationship when plotted would fall above the line indicating the critical minimum relationship. On the other hand, a reduction in denier without a corresponding reduction in web weight will fall below the minimum relationship required by the equation and thus will result in an inferior, incompletely penetrated product when foamed. It is theorized that this minimum relationship is controlled by the interfiber cohesion between the randomly oriented staple fibers when they are compressed. It is known that small denier fibers have greater interfiber cohesion than large denier fibers. Consequently, lighter weight batts must be used when smaller denier fibers are employed than with the larger denier fibers. Also, the larger denier fibers produce a more porous structure that is more readily penetrated by the foamable mixture. We have therefore recognized the critical relationship set forth above as being a substantial advancement in the reinforced foam art.

Fibers suitable for use in this invention include the synthetic fibers such as nylon, polyester, acrylic, polypropylene, and the like; artificial fibers such as rayon and cellulose acetate; and natural fibers such as cotton, wool, or hog's hair; and fibers formed from inorganic materials such as fiber glass or the metals. These fibers are preferably crimped and in staple lengths ranging from about one-half inch to two inches.

The foamable materials may be comprised of any of the commercially available resin composition foams which have the capability of being dispensed onto a moving belt as a flowable material having the proper viscosity to penetrate a fibrous batt while passing through opposed pressure rollers and thereafter foaming at a rapid rate to produce a flexible foam. Foamable materials which have been found especially suitable are the polyurethane foam mixtures which are comprised essentially of a polyisocyanate such as toluene diisocyanate and a hydroxyl-containing compound such as polyesters, polyethers and alkylene glycols. Certain additives such as catalysts, nucleating agents, fillers, cell control agents, flame retardants, pigments, surfactants and the like may be employed to modify the foam product to obtain desired properties. Thus, the particular formulation of a given polyurethane foam composition varies widely depending upon the properties desired.

A preferred illustrative embodiment of a fiber reinforced foam product manufactured in accordance with the present invention is shown in the accompanying drawings, in which:

FIG. 1 is an elevational view of the apparatus employed to carry out the method of this invention to make the product described herein;

FIG. 2 is a pictorial view of the product of this invention illustrating the random distribution of the staple fibers throughout the foam material; and FIG. 3 is a graphical representation illustrating the relationship which exists between the size of the fibers and unit weight of batts formed from said fibers.

Referring to FIG. 1, a fibrous batt is fed onto a continuous carrier belt 12 which advances the batt underneath the mixing head 14. The mixing head 14 is traversed back and forth across the width of the batt to dispense a foamable mixture which penetrates the batt completely as the impregnated batt is compressed between the opposed metering rolls 16 and 18. After passing from the metering rolls, the impregnated batt is incased between the lower carrier belt 12 and an upper belt 20. The carrier belt should be flexible and coated with a resilient material having good release properties such as disclosed in copending application Ser. No. 567,092, filed July 22, 1966.

The impregnated batt is advanced through a heated chamber where foaming occurs to produce the fiber reinforced product 22 of the present invention, as shown in FIG. 2. The foam begins to rise and the fibrous batt begins to recover after passing through the metering rolls and proceed at the same rate until the foaming is complete. Both belts are advanced at the same rate of speed to avoid disruption of the foam surfaces which would result in a collapse of the foam. The density of the batt with respect to the fiber denier must be selectively predetermined in order to insure that the foam mixture completely penetrates the compressed batt to contact each of the fibers. Similarly, the interfiber cohesion is accurately controlled to produce a recovery rate of the fibers commensurate to the growth rate of the foam. If the batt is not properly impregnated because of an improper denier size versus web weight, poor foaming occurs. Also, where interfiber cohesion results in either a slower or faster recovery rate than the growth rate of the foam, poor foaming occurs. Therefore, the denier size and web weight relationship must be strictly adhered to as set forth by the equation $$y = 1.9(7.368)^{\frac{x-0.5}{10.5}}$$

which establishes a minimum ratio or lower limit. Slightly larger denier size than represented by the above minimum relationship is preferred. For example, the preferred denier is represented by the function of the equation $$y = 1.9(7.368)^{\frac{x-0.5}{10.5}}$$

wherein $x$ and $y$ are as previously defined, which provide for an increased denier size per unit area of web over the minimum denier which can be employed. Except for interfiber cohesion, the recovery rate of the fibers is substantially unrestricted. These relationships are graphically illustrated in FIG. 3. The dashed line represents the minimum relationship and the continuous line represents the preferred relationship.

The nonwoven batts or webs are prepared by conventional techniques using any of the well-known carding systems, air laying system or Rando-Webber. Preferably, the web is fed onto the carrier belt directly from the carder and not needle punched or otherwise consolidated, since the high degree of fiber entanglement would produce an excessive amount of interfiber cohesion which may restrict the foam growth.

In continuous operation the ends of the batt are cut diagonally so that they may be joined together to form a scarf joint whereby the metering rolls are supported to produce a uniform seam. It has been found that butt joints parallel to the rolls separate when passing through the nip thereof causing a thin section in the foam product. The pressure of the adjustable metering rolls, which are normally set to exert approximately 25 p.s.i. and spaced 10 mils apart for producing sheet-type products, tend to squeeze the abutted batts apart. Therefore, the joint should be on a diagonal sufficient to resist this type separation.

The following are examples of reinforced foam products made in accordance with the present invention wherein parts are by weight unless otherwise specified.

EXAMPLE 1

A nonwoven batt weighing 1 ounce per square yard was prepared from 15-denier, 1-inch acrylic staple fibers on a Rando-Webber. The batt was fed onto the lower support belt of the apparatus shown in FIG. 1. A polyurethane foam was deposited on the web by means of a traversing mixing head adapted to stir three streams at high speeds. One stream comprised of a mixture of 100 parts of a polyurethane prepolymer (designated Isofoam L-128) and 0.5 part Dow Corning Silicone, chilled to 0° C. were introduced at the rate of 100.5 grams per minute. A second stream included 3.0 grams per minute of a mixture of one part methyltriethylene diamine and 2.0 parts water. The third stream was a nucleating air which was fed into the mixing head at the rate of 0.5 standard cubic foot per hour. The mixture of foam and fibers was then passed between the carrier belts at approximately 2 feet per minute between a pair of nip rolls set at 25 p.s.i. and 10 mils separation and then into a heated oven having three zones which were at 120° C. in zone 1, 125° C. in zone 2, and 150° C. in the final zone. The product on removal from the oven was post cured in a circulating hot air oven at 120° C. for two hours.

The product was tested for compression properties by three cyclic compressions at room temperature using a 200 lb. total load and compressing 90% of the total load (180 lbs.) in rapid succession. The gauge length was set according to the thickness of the samples and generally ranged from 0.2 to 0.7 inch. The head speed was set at a speed of 0.5 inch per minute and the chart speed at 10 inches per minute. The areas under the three compression curves were averaged as were the areas under the recovery curves and are reported as compression and recovery forces. The breaking strength of the samples was determined by breaking 1-inch wide samples cut in both the machine and transverse directions. The weight of the samples in ounces per square yard was determined by weighing the 9 x 5 inch samples where the weight in grams is equal to the weight in ounces per square yard. The thickness of the samples was determined in a conventional manner by using a micrometer.

EXAMPLES 2 THROUGH 5

A series of samples were prepared as described above from 15 denier acrylic fiber webs weighing 2, 2, 5, 3, 5 and 4 oz./yd.$^2$ respectively. The properties of these samples are shown in Table I.

EXAMPLE 6

A control sample was prepared in accordance with the procedure of Example 1 except no reinforcing fibers were employed.

Properties of the samples containing various amounts of fibers are compared with the properties of the all foam control sample in Table I below.

TABLE I

| Example | Weight of reinforcing web (oz./yd.$^2$) | Weight of foam composite (oz./yd.$^2$) | Thickness (inches) | Compression force (avg. area under compression curves) | Recovery force (avg. area under recovery curves) | Tensile strength (lbs./in.) Machine direction | Tensile strength (lbs./in.) Transverse direction |
|---|---|---|---|---|---|---|---|
| 1 | 1 | 18.7 | 0.50 | 251 | 159 | 8.9 | 8.1 |
| 2 | 2 | 24.4 | 0.64 | 356 | 207 | 19.0 | 11.2 |
| 3 | 2.5 | 27.1 | 0.69 | 402 | 245 | 20.5 | 16.4 |
| 4 | 3.5 | 27.7 | 0.65 | 416 | 243 | 15.1 | 24.8 |
| 5 | 4.0 | 30.1 | 0.65 | 436 | 267 | 40.3 | 20.5 |
| 6 | Control | 11.0 | 0.31 | 146 (2.92 in. lbs.)$^1$ | 103 | 5.1 | 5.6 |

$^1$ To convert area under Instron compression and recovery curves from integrator reading to energy:
$$\left(\frac{\text{Integrator reading}}{5,000}\right) \text{(full scale load) (cross head-speed)} = \text{energy in inch pounds.}$$

EXAMPLES 7 THROUGH 14

A series of samples were prepared as described in Example 1 with the exception that the 15-denier acrylic staple fiber webs employed were prepared on a Rando-Webber and laminated to give the web weights tabulated below. The nip roll setting was lowered to 6 mils to produce thinner composites.

TABLE II

| Example number | Weight of web (oz./yd.$^2$) | Weight of foam composite (oz./yd.$^2$) | Thickness (inches) | Compression force | Recovery force | Tensile sterngth (lbs./in.) Machine direction | Tensile sterngth (lbs./in.) Transverse direction |
|---|---|---|---|---|---|---|---|
| 7 | 1.3 | 13.0 | 0.30 | 164 | 121 | 10.8 | 9.2 |
| 8 | 2.3 | 13.1 | 0.28 | 172 | 119 | 17.5 | 13.6 |
| 9 | 3.6 | 15.0 | 0.30 | 277 | 178 | 30.7 | 23.7 |
| 10 | 4.6 | 31.1 | 0.37 | 291 | 176 | 29.7 | 20.7 |
| 11 | 5.9 | 27.1 | 0.40 | 456 | 288 | 63.1 | 48.9 |
| 12 | 6.9 | 31.4 | 0.41 | 482 | 303 | 52.1 | 57.8 |
| 13 | 8.2 | 36.7 | 0.45 | 590 | 388 | 87.8 | 61.0 |
| 14 | 9.2 | 34.9 | 0.44 | 558 | 364 | 72.2 | 65.1 |

The foregoing data illustrates that the addition of reinforcing 15-denier non-woven webs with weights greater than 8.2 oz./yd.$^2$ at a thickness of approximately ½ inch gave no additional increase in the compression strength while the recovery properties of the composites actually began to decrease as illustrated by Example 14. It will be noted that the data of Example 13 corresponds with the curve representing the preferred fiber denier to web weight relationship as illustrated in FIG. 3.

EXAMPLE 15

A study was made of samples prepared from 3-denier staple fiber carded webs to determine the maximum amount of this denier fiber which could be used to reinforce approximately ½ inch thick foam composites. When webs containing 3 oz./yd.$^2$ were employed the polyurethane foam recipe did not completely penetrate and encapsulate the fibers which resulted in an unsatisfactory product having non-uniform surfaces was obtained. Where the composite was defective in this manner the product was, of course, extremely weak and any force greater than the small amount of interfiber cohesive force was adequate to tear the composite and render it useless for almost any commercial end-use.

EXAMPLE 16

When the weight of the 3-denier fiber webs was reduced to 1 oz./yd.$^2$ the non-woven web was completely penetrated and the fibers were uniformly dispersed throughout the foam. The properties of the foam composite and the control (Example 1) are shown below.

TABLE III

| Weight of foam (oz./yd.$^2$) | Thickness (inches) | Average compression force | Average recovery force | Tensile strength (lbs./in.) Machine direction | Tensile strength (lbs./in.) Transverse direction |
|---|---|---|---|---|---|
| 11.0 (Ex. 6) (control) | 0.31 | 146 | 103 | 5.1 | 5.6 |
| 15.4 (Ex. 16) (reinforced) | 0.40 | 202 | 130 | 11.2 | 8.9 |

The breaking elongation of the all polyurethane foam was approximately 250% as compared to 550% for the fiber reinforced foam product.

EXAMPLE 17

It was reasoned that a blend of smaller denier fibers with larger denier fibers might provide a more easily penetrated web and permit the use of larger amounts of smaller denier fibers than when the smaller denier fibers are used alone. A non-woven web was prepared weighing 2.3 oz./yd.$^2$ from a blend of 60% by weight 28-denier fiber and 40% weight 3-denier fiber and impregnated with foam as described above. The web was completely penetrated and the fibers were uniformly distributed throughout the composite.

EXAMPLES 18–20

Since the penetration of the fibrous webs is obviously related to the viscosity of the resin employed the influence of viscosity on the penetration was investigated by employing prepolymer mixtures which contain an inorganic filler. Mixtures of 100 parts (Isocyanate Products Isofoam L–128 prepolymer); 0.5 part of Dow Corning 200 with 50 and 100 parts of barium sulfate were prepared and the viscosity of the mixtures determined using a Brookfield viscosimeter (the rapid change in viscosity of the catalyzed system makes it impractical to measure the viscosity of the total, catalyzed system). The results are tabulated below in Table IV.

TABLE IV

| Parts of BaSO$_4$: | Viscosity at 23° C., cps. |
|---|---|
| 0 | 2,250 |
| 50 | 2,675 |
| 100 | 5,550 |

At 12° C. the viscosity of the 100 parts filler recipe increased to 17,560 cps. It was found that it was impractical to pump this mixture at approximately 0° C. using a conventional gear pump. However, the 50 parts filler recipe had a viscosity of approximately 9,000 cps. at 12° C. temperature and could be pumped with a conventional gear pump at the 0° foaming temperature.

In Example 19 an acrylic web containing approximately 3 oz./yd.² of 15-denier fibers was uniformly impregnated using the 50 parts BaSO₄ filler recipe to give an exceptionally firm composite. The composite reinforced with 50 parts BaSO₄ (Example 18) was also firmer than a similar sample without BaSO₄. The blend of fibers employed to reinforce the unfilled foam in Example 17 was also used to reinforce the BaSO₄ containing foam (Example 20). The properties of these samples are tabulated below.

TABLE V

| Example Number | Weight of foam composite (oz./yd.²) | Thickness (inches) | Average compression force | Average recovery force | Tensile strength (lbs./in.) | |
|---|---|---|---|---|---|---|
| | | | | | Machine direction | Transverse direction |
| 6 | 11.0 | 0.31 | 146 | 103 | 5.1 | 5.6 |
| 18 | 23.0 | 0.50 | 280 | 155 | 6.3 | 5.9 |
| 19 | 35.5 | 0.57 | 436 | 248 | 30.9 | 17.6 |
| 20 | 35.9 | 0.51 | 472 | 254 | 31.9 | 22.8 |

EXAMPLES 21 THROUGH 24

The influence of pressure applied to the nip rolls on composite thicknesses was determined by varying the pressure on the rolls between 0 and 75 p.s.i. and observing the thickness of the foam produced. The results are shown below:

TABLE VI

| Example | Pressure applied to the nip rolls (p.s.i.) | Thickness of product (in.) | |
|---|---|---|---|
| | | Nonreinforced | Reinforced |
| 21 | 0 | 0.50 | 0.75 |
| 22 | 25 | 0.31 | 0.50 |
| 23 | 50 | 0.31 | 0.50 |
| 24 | 75 | 0.31 | 0.50 |

At nip roll pressures of 25 p.s.i. and greater no change in thickness occurred. Thus, from Example 1 and the present example it is seen that it is possible to control the thickness of foam composites by adjusting the nip roll spacing and also by adjusting the nip roll pressure.

EXAMPLE 25

A prolonged run of the fiber reinforced foam composite was made by manually joining 8-foot sections of carded 1 oz./yd.², 3-denier webs. After approximately thirty minutes it was observed that the molecular weight of the foam rolling in a bead at the nip rolls became excessive and lumps of polymer began to separate from the polymer bead. These lumps passed under the nip rolls and appeared on the surface of the composites as elongated white streaks which required cutting of the composites for removal. The undesirable polymer lumps which occurred were avoided by reducing the catalyst level. Continuous operation of the process free from objectionable lumps was obtained by lowering the catalyst level from 1 part of methyltriethylene diamine to 0.8 part.

EXAMPLE 26

Methods of joining webs of the fibers were investigated. After evaluating several methods for joining the ends of the webs it was concluded that any method which would provide continuous support for the nip roll to prevent the rise and fall of the rolls would be successful. One such method which was found to be satisfactory was to cut the ends of the webs to form scarf joints. If the scarf joint angle was small the rolls were continuously supported and no imperfections at the web joints occurred and continuous operation was achieved. It was observed that joints in parallel with the rolls tended to separate and resulted in collapsed foam at the joined area.

EXAMPLE 27

In routine evaluations of the composites produced samples of the pad were placed on the laboratory tile floor and compressed by stepping on the composites. Surprisingly it was found that the composites prepared as described in this disclosure form a temporary vacuum seal between the shoe sole, or any other continuous planar surface, and the composites. Foam specimens cut from polyurethane buns do not form a similar temporary seal. A polished, standard 2¼-inch diameter foot was installed in an Instron tensile tester and a sample of the foam was compressed at a head speed of 0.2 inch per minute with a chart speed of 5 inches per minute and allowed to recover at the same rate. The area under the recovery curve at this standard rate was 2288 chart units. When the recovery conditions were accelerated 10 fold to give a head speed of 20 inches per minute and a chart speed of 50 inches per minute the area under the curve was 3,700 units when converted to standard conditions. It is theorized that the increased recovery force is caused by the temporary vacuum seal formed. The sample from Example 5 was used in this test.

EXAMPLE 28

The observations made in Example 26 led to the speculation that very wide widths of reinforced foam could be prepared by placing webs side by side with edges either overlapped or butted together parallel to the carrier belts. The process was operated as described in Example 26 with the exception that webs either cut longitudinally and the edges butted together or else simply overlapped. Both techniques produced satisfactory composites. This process will, therefore, allow the use of conventional 5-foot wide carded webs, with edges either trimmed and butted together or simple overlapped, to be joined to produce foam composites of indefinite widths.

An immediate application for foam composites such as those described above is their use as carpet pads or underlays for use beneath floor coverings.

A collection was made of commercially available carpet pads and evaluated. None of the pads which are tabulated below in Table VII, displayed the vacuum properties exhibited by the composite of Example 27.

TABLE VII

| Commercial pad | Weight (oz./yd.²) | Thickness (inches) | Compression force | Recovery force |
|---|---|---|---|---|
| A | 53.3 | 0.33 | 296 | 216 |
| B | 44.4 | 0.34 | 282 | 138 |
| C | 44.2 | 0.39 | 313 | 143 |
| D | 41.2 | 0.50 | 398 | 167 |
| E | 29.0 | 0.27 | 219 | 110 |
| F | 67.0 | 0.47 | 310 | 212 |
| G | 57.9 | 0.34 | 235 | 160 |

We claim:
1. A method for making sheet-like structures of fiber-reinforced foam products which comprises (1) selecting a nonwoven web consisting of randomly oriented fibers having a fiber denier (Y) of approximately that determined by the equation:

$$Y = 2.5\left[(6)^{\frac{x-0.5}{9.5}}\right]$$

where $x$=web weight in ounces per square yard; (2) dispensing a foamable mixture onto the web; (3) compressing the web and the mixture between opposed pressure rolls to cause complete penetration of the mixture throughout the web of fibers; and (4) removing the web from said rolls whereupon recovery rate of the web corresponds with foam rate of the mixture to prevent significantly restrictive forces from being imparted to the growth of foam cells.

References Cited

UNITED STATES PATENTS

| | | | |
|---|---|---|---|
| 2,719,806 | 10/1955 | Nottebohm | 156—77X |
| 3,007,205 | 11/1961 | House | 156—78X |
| 3,223,576 | 12/1965 | Evans et al. | 156—79X |

CARL D. QUARFORTH, Primary Examiner

S. R. HELLMAN, Assistant Examiner

U.S. Cl. X.R.

161—159